June 24, 1930.   N. FINCH   1,766,780
TRACTOR AND TRAILER
Filed March 26, 1926   5 Sheets-Sheet 1
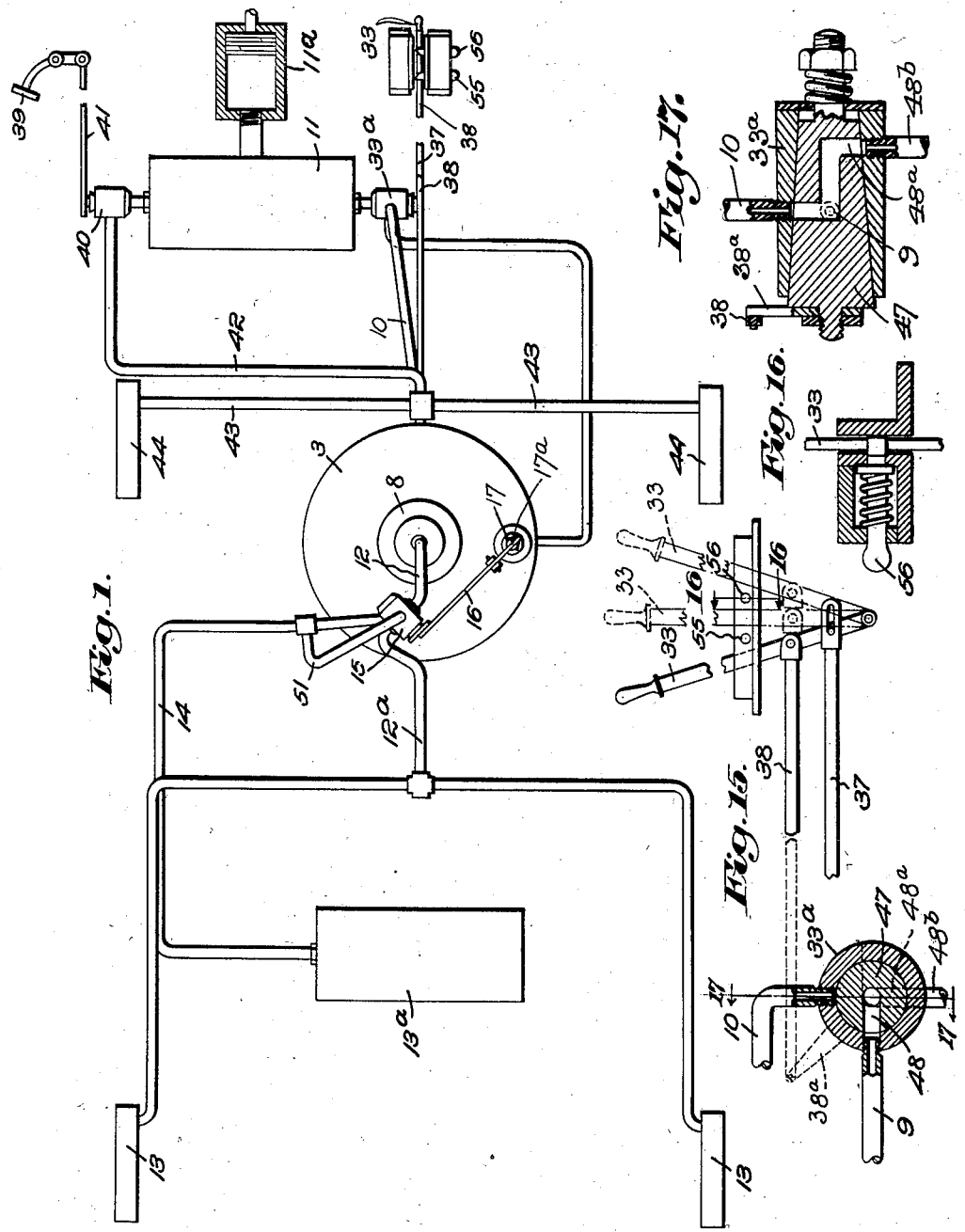
Inventor:
Nathaniel Finch,
by Emery, Booth, Janney & Varney,
Attys

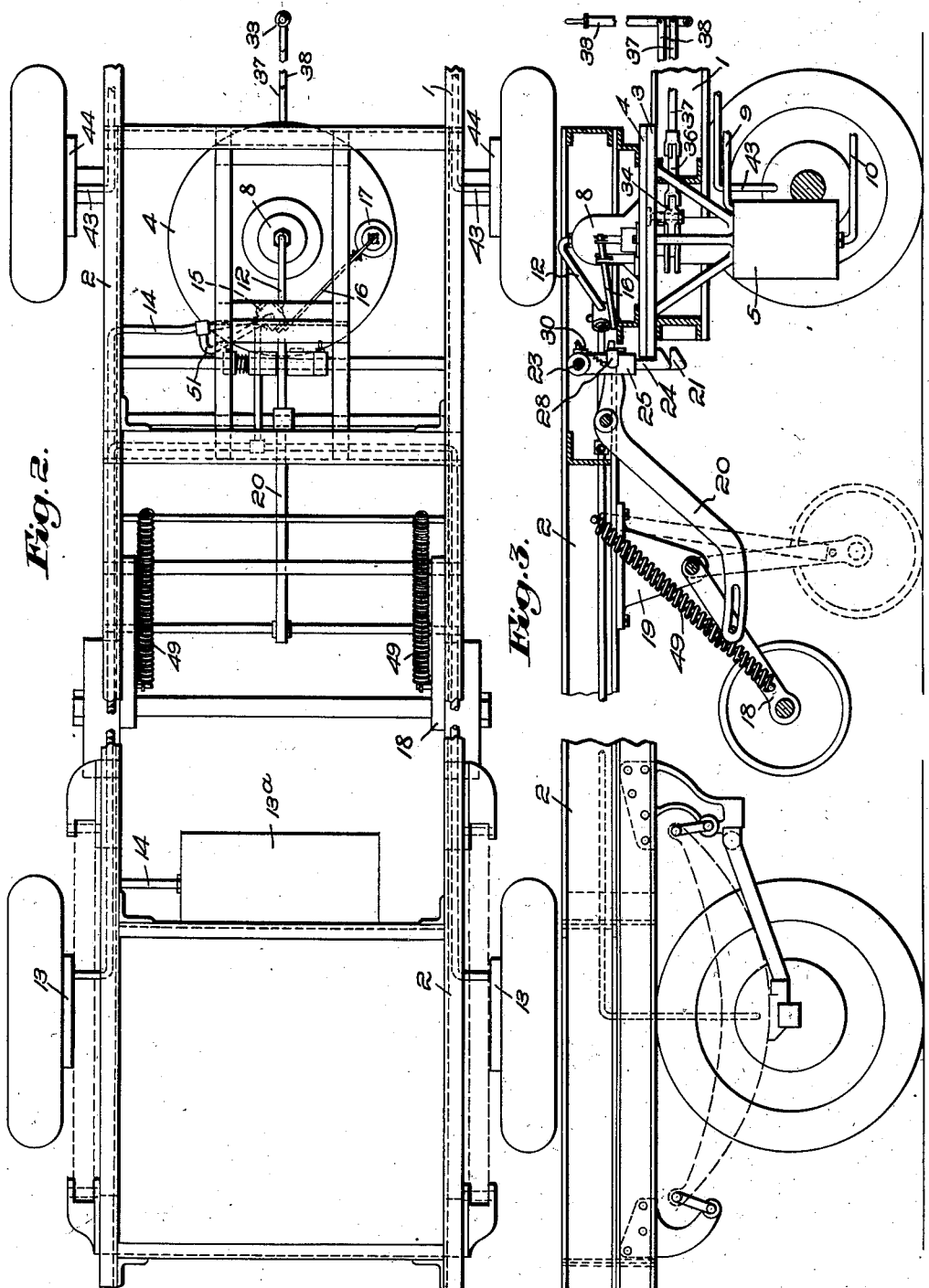

June 24, 1930.　　　　　N. FINCH　　　　　1,766,780
TRACTOR AND TRAILER
Filed March 26, 1926　　　5 Sheets-Sheet 3
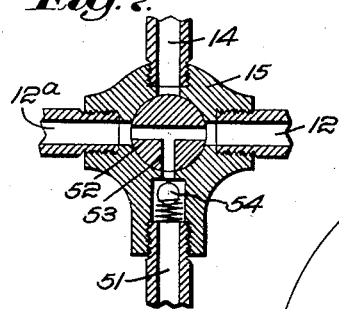
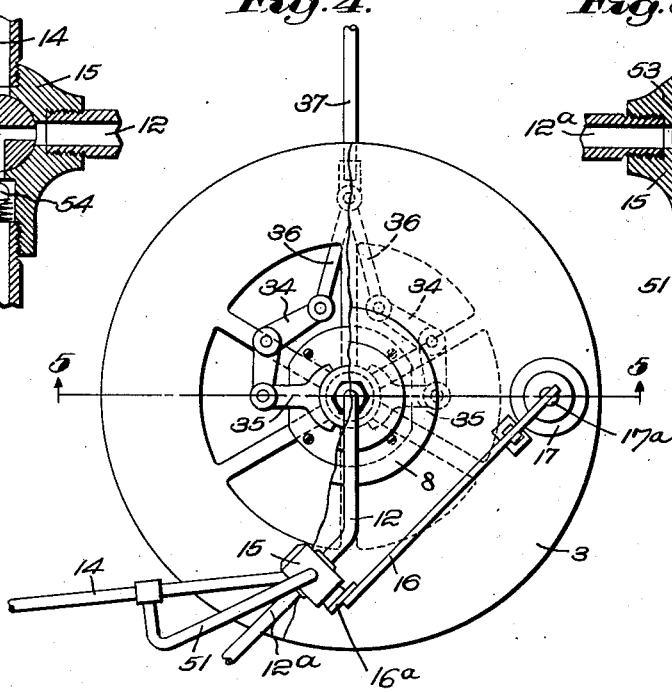
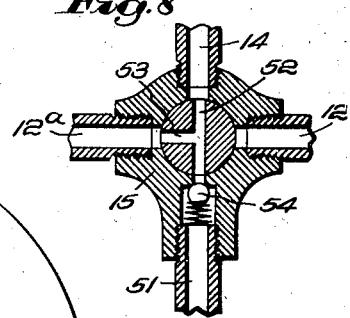
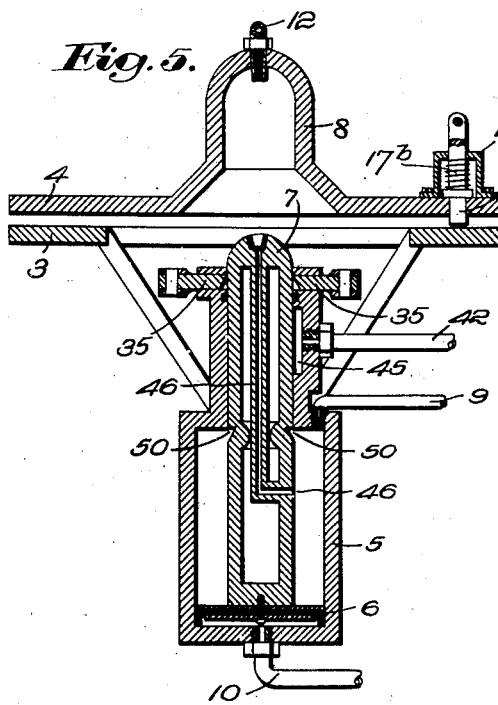
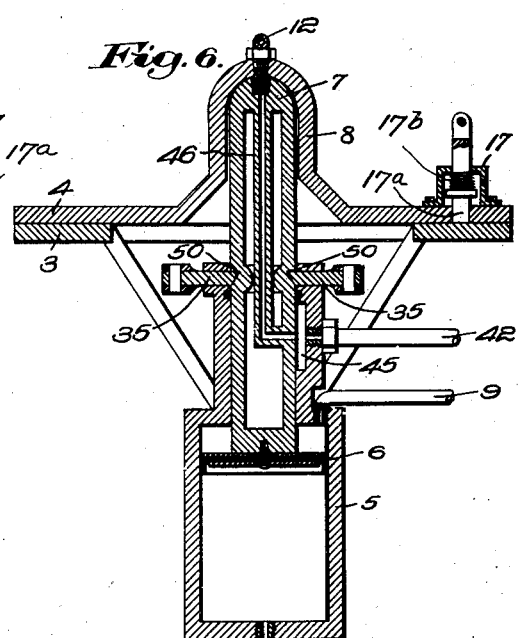
Inventor:
Nathaniel Finch,
by Emery, Booth, Janney & Varney,
Attys.

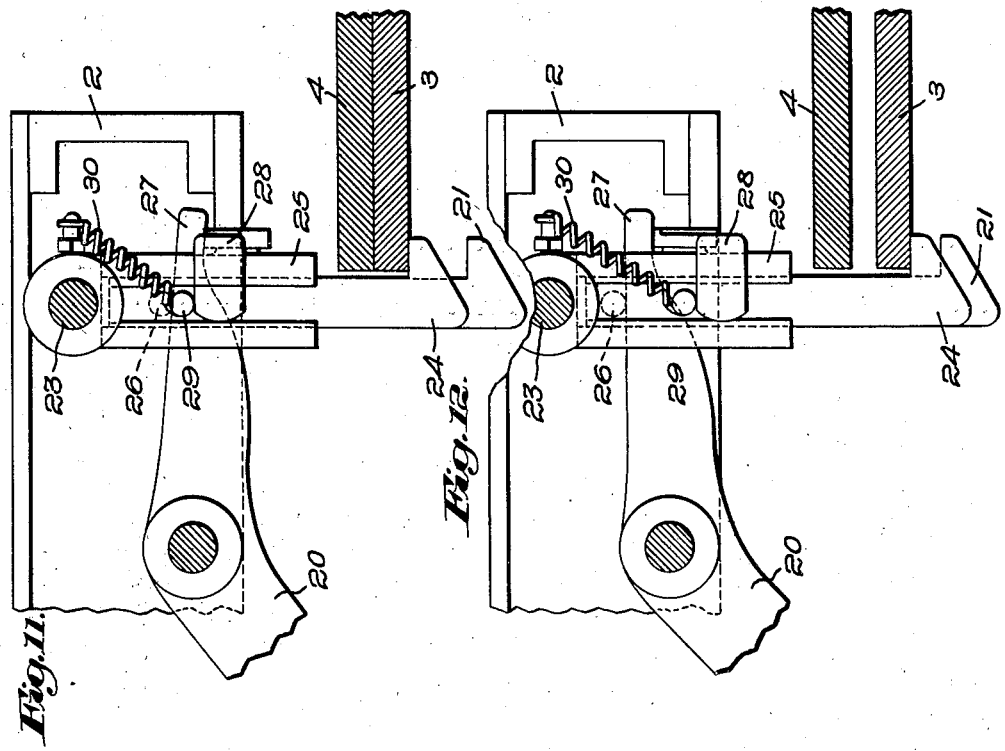
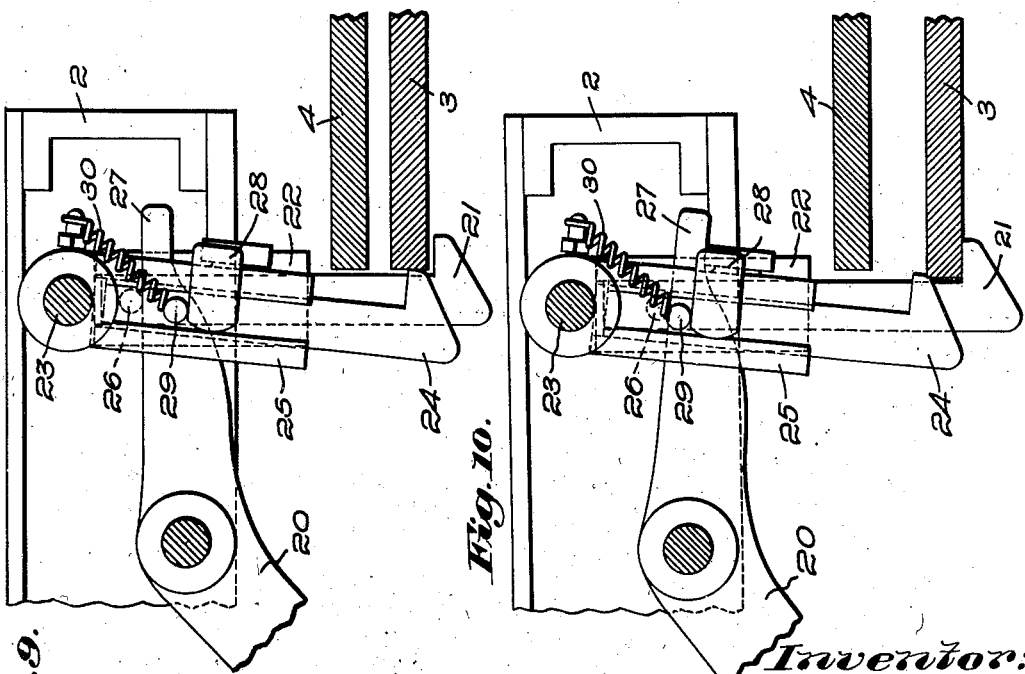

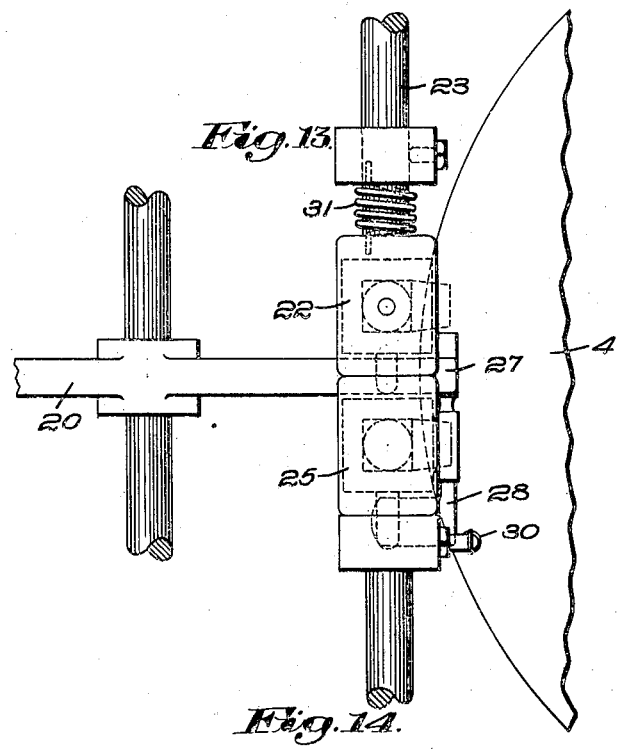
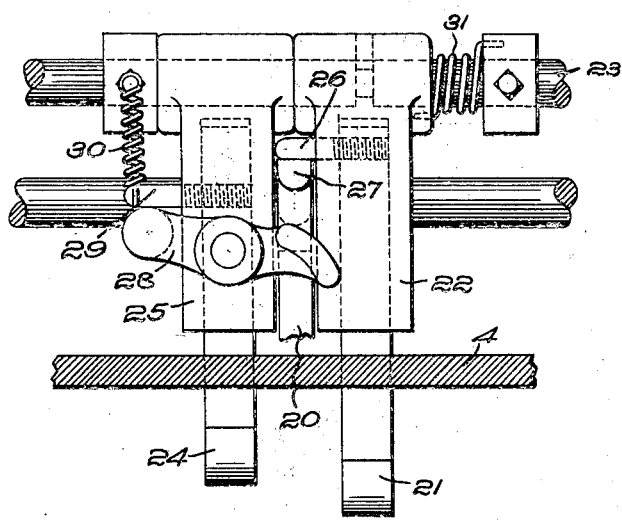

Patented June 24, 1930

1,766,780

UNITED STATES PATENT OFFICE

NATHANIEL FINCH, OF NEW YORK, N. Y.

TRACTOR AND TRAILER

Application filed March 26, 1926. Serial No. 97,583.

This invention aims to provide improvements in tractors and trailers.

In the drawings, which illustrate a preferred embodiment of my invention:—

Figure 1 is a plan view showing a general diagrammatic layout of the coupling means, braking means and fluid pressure supply and operating means for a tractor and trailer;

Fig. 2 is a somewhat diagrammatic plan view of the trailer and the rear portion of the tractor, showing the tractor and trailer in coupled relation;

Fig. 3 is a side elevation of the parts shown in Fig. 2, showing the pivoted support for the trailer in full in one position and dotted in the other;

Fig. 4 is a plan of the fifth wheel and associated parts, the upper part of the fifth wheel being partly broken away;

Fig. 5 is a section on the line 5—5 of Fig. 4, showing the relation of parts before the coupling takes place;

Fig. 6 is a section similar to Fig. 5, showing the parts after coupling;

Fig. 7 is a section showing one position of the control valve for brakes of the trailer;

Fig. 8 is a section showing the other position of the valve shown in Fig. 7;

Figs. 9 through 12 are detail views of the mechanism for operating the pivoted wheels of the trailer showing the table portions of the fifth wheel and the relation of the pivoted levers, first (Fig. 9), in normal position with rear of tractor under front of trailer with pivoted wheels down; second (Fig. 10), position of parts with pivoted wheels up; third (Fig. 11), completely coupled; and fourth, uncoupled, wheels down and tractor ready to drive away from trailer;

Fig. 13 is a detail plan view of the mechanism for raising and lowering the pivoted wheels of the trailer;

Fig. 14 is an end elevation of the parts shown in Fig. 13;

Fig. 15 is a view of the means for controlling the raising and lowering of the coupling pin, the valve being shown in cross-section;

Fig. 16 is a section on the line 16—16 of Fig. 15, showing one of the stop pins for controlling operation of the hand-shifting lever;

Fig. 17 is a section taken on the line 17—17 of Fig. 15, the turning part of the valve having been turned to the position for admitting the fluid pressure to raise the coupling pin.

Referring to the drawings, I have shown a tractor and a trailer equipped with means for coupling the tractor and trailer together, means for permitting operation of the brakes of the trailer from the driver's seat of the tractor and means for automatically raising and lowering the pivoted front support of the trailer.

The particular embodiment of my invention, which I have selected for illustrative purposes, shows fluid pressure operated brakes on both the tractor and trailer and fluid pressure operated coupling means, the fluid pressure being preferably air pressure.

The details of the brakes on both trailer and tractor, and of the general construction of the tractor and trailer, is omitted as they may be of any suitable type and construction.

The means for coupling the tractor 1 and trailer 2 comprise a sort of fifth wheel between the two and includes a table 3 carried by the tractor 1 and a second table 4 carried by the trailer 2. From the table 3 is suspended a cylinder 5 containing a piston 6, the upper end of which provides a coupling pin 7 adapted to enter the dome-shaped housing 8 carried by the plate 4 to couple the trailer with the tractor. The tables rest upon each other when coupling is completed, thereby to permit the tractor to turn easily relative to the trailer, the pin 7 providing a pivot. Two pipes 9 and 10 communicate with the cylinder 5 from the air supply tank 11 to admit air under pressure for acutating the piston in the manner hereinafter described. Air pressure is maintained in the tank 11 by means of the compressor 11$^a$ shown in Fig. 1 of the drawings.

A pipe 12 is connected to the top of the housing 8 and branches to both brakes 13—13 of the trailer. An auxiliary air tank 13$^a$ is carried by the trailer to supply air through a pipe 14 to the pipe 12$^a$ through a valve 15 for keeping the brakes applied when the trailer is not coupled with the tractor. The valve 15 is located in the pipe lines 12 and 14 to control the flow of air in the manner hereinafter described. This valve 15 is preferably controlled automatically by a lever 16 connected with a plunger device 17 carried by the table 4 as shown in Figs. 1, 5 and 6.

At the front end of the trailer is provided a wheeled support 18 pivoted upon the brackets 19 so that it may support the front end of the trailer when the tractor is not coupled therewith, while being adapted to swing up off the ground when the trailer and tractor are coupled as shown in Fig. 3. The means for swinging the wheeled support from one position to the other includes a lever 20 pivoted at the center of the trailer and connected at one end to the wheeled support. The other end of the lever is acted upon by a series of levers and catches operated by the table 3 and movement of the coupling pin 7.

The means operable by raising and lowering the coupling pin 7 to operate the wheeled support 18 include a slidable catch or latch 21 mounted for sliding movement in a part 22 pivoted to a rod 23 supported by the chassis of the trailer 2. A second latch 24 is slidably mounted in a part 25 also pivoted upon the rod 23. A pin 26 is carried by the latch 21 for engagement with the end 27 of the lever 20 which passes between the two parts 22 and 25 as shown in Fig. 14. A lever 28 is pivoted upon the part 25 and operated by a pin 29 carried by the latch 24 to bear against the under side of the end 27 of the lever 20. A spring 30 normally pulls upwardly on the latch 24 and this spring and a coil spring 31 normally urge the parts 22 and 25 respectively toward the plate 4 so that the latches 21 and 24 normally bear against that plate which acts as a stop.

The hand lever 33 shown in Figs. 1 and 15 is located in the driver's compartment of the tractor and operates the valve 33ª for controlling the admittance of air pressure to the cylinder 5 for operation of the piston 6 and also controls means for releasing the pin 7 to permit uncoupling of the tractor from the trailer.

The pin-releasing means includes a pair of levers 34—34 pivoted upon the part of the fifth wheel carried by the tractor, a pair of opposed sliding fingers 35—35 mounted in the piston casing 5 and each connected to one end of one of the levers 34 and a pair of links 36—36 connecting the other ends of the levers 34 to a rod 37 attached to the hand lever 33. The valve 33ª is operated by a rod 38 (Fig. 15) having one end connected with the hand lever as shown in Fig. 1, and the other end connected to the arm 38ª secured to the rotary part 47 of the valve 33ª, as shown in Fig. 17.

In Fig. 1, I have shown a brake pedal 39 connected for operation of a valve 40 through the rod 41 to admit air pressure to the pipe 42, which branches off in pipes 43—43 to the brakes 44—44 of the tractor. When the tractor and trailer are coupled this same brake 39 will operate the braking means on the trailer at the same time that it operates the braking means on the tractor, because air connection is made from the pipe 42 through the coupling mechanism, as shown in Fig. 5, then through the pipes 12 and 12ª, the latter pipe branching off into connection with the brakes 13 of the trailer, as shown in Figure 1. The pipe 42 also communicates with a port 45 in the upper part of the cylinder 5 (Figs. 5 and 6) which in turn communicates with a passage 46 in the pin 7 to convey air from the tank 11 through a fluid-tight connection made by packing between the passage 46 and the pipe 12 as shown in Fig. 6.

The tractor may be coupled with the trailer by simply backing the tractor toward the trailer until the plate 3 of the fifth wheel is under the plate 4. As a clearance is allowed between the plates 3 and 4 when the tractor and trailer are on a level surface, this clearance permits coupling even when the surface of the road bed is somewhat uneven. By making the plates 3 and 4 circular, the tractor may be coupled with the trailer when backed toward it from various angles. When the plate 3 is under the plate 4, as shown in Figs. 5 and 9, the latch 21 (Fig. 9) is hooked beneath the plate 3. By pushing the lever 33 from a neutral position, between the stops 55 and 56 (shown in dotted lines in Fig. 15), to the forward position, as shown in Figure 1 (also shown in dotted lines, Fig. 15), the rotary part 47 of the valve 33ª is turned so that the port 48 is brought into communication with the pipe 10, as shown in Fig. 17. This communication between the tank 11 and pipe 10 is made by means of the communication of the relatively wide port 48ª with the pipe 48ᵇ connecting the valve casing with the tank 11, as shown in Figs. 15 and 17. The forward position of the lever 33 and communication of the port 48ª with the pipe 48ᵇ is also shown by dotted lines in Fig. 15. Air pressure will then be admitted to the bottom of the cylinder 5 to force the piston 6 and pin 7 upwardly. The relatively wide mouth at the entrance to the dome 8 permits centering of the parts if slightly out of alignment. As the pin 7 makes a seat against the top of the dome 8 and continues to move upwardly, the front end of the trailer is lifted bodily to raise the pivoted support 18 from the ground. During this lifting action, the lever 21 catches beneath the plate 3 and is held while the front end of the trailer and its parts are moved upwardly, the rear wheels providing a pivot. This last-mentioned action causes the lever 20 to be rocked about its pivot because it is carried upwardly and the end 27 is held against the pin 26. Therefore as the lever 20 rocks, the wheeled support is swung by the lever 20 about its pivot until the center line of the spring 49 is moved beyond a line passing between the spring ends and the pivot for the support 18. Then the spring carries the support 18 relative to the lever 20 into the position shown in full lines in Fig. 3. The last part of the movement of the support 18 relative to the lever 20 is permitted because of the pin and slot arrangement between the two parts.

During the upward movement of the pin 7, the slots 50—50 in the sides thereof (Figs. 5 and 6) were moved upwardly past the fingers or jaws 35 and did not prevent the complete upward stroke of the piston 6 and pin 8 to accomplish raising the pivoted support 18 from the ground as described above.

Now if the driver pulls the lever 33 to a neutral position, the supply of air pressure will be cut off from the pipe 10 and the weight of the tractor will automatically press the pin 7 downwardly until the plate 4 rests upon the plate 3 and the jaws 35 snap into the slots 50—50 to hold the pin 7 against further downward movement, as shown in Fig. 11. It will also be noted that at the completion of this last operation the latch 24 snaps under the plate 3 and the latch 21 is carried some distance below it. The tractor is now completely coupled with the trailer and the weight of the front end of the trailer is carried by the plate 3 rather than by the pin 7.

When the tractor and trailer are coupled as above described, the brakes on the wheels of the trailer may be applied at the same time as the brakes of the tractor are applied by simply pressing upon the brake pedal 39. This pedal is connected to the valve 40, which may be operated to allow air pressure to pass from the tank 11 through the pipes 42 and 43, to the brakes 44 of the tractor and also through the passage 46 in the pin 7 to the pipe 12, then through the valve 15 and pipes 12ª to the brakes 13. Thus a braking action is provided both for the trailer and the tractor.

The valve 15 is turned to the position shown in Fig. 7 when the coupling is complete by the operation of the plunger stem 17ª of the plunger device 17 and lever 16 so that when air is admitted to the pipe 12 when applying the brakes, the pipe 51 will be in communication with the pipe 12 through the ports 52 and 53 in the valve. A check valve 54 is located in this pipe 51 which merely by-passes into the pipe 14 so that some of the air will be forced to the tank 13ª to keep it full of air under sufficient pressure to operate the brakes 13 when the tractor is not coupled with the trailer.

Stops 55 and 56 are preferably located in the path of the shifting lever 33 (as shown in Figs. 1 and 15) to provide for the neutral position of the lever and also to insure against movement of the lever in the wrong direction at such a time as it should be first moved in a certain direction. If the operator has to pull out one of the stop members before he can shift the lever, he will be more apt to shift the lever in the proper direction than if the lever could be moved freely in any direction. One side of each of the stops is beveled so that the lever can be pushed back to neutral with first moving the stops.

When the driver of the tractor wishes to uncouple the trailer, he first pushes the forward lever 33 to the position shown in Fig. 1, and in dotted lines, Fig. 15 thereby operating the valve 33ª to admit air pressure to the pipe 10 (in the same manner as heretofore described in connection with the coupling operation and shown in Fig. 17) so that the piston 6 may be forced upwardly from the position shown in Fig. 6. As the latch 24 is caught beneath the plate 3, as shown in Fig. 11, it will be held stationary while the front end of the trailer and other parts will be lifted. This action will cause the lever 28 to contact with the pin 29 carried by the latch 24 and move about its pivot so as to act upon the under side of the end 27 of the lever 20, as shown in dotted lines in Fig. 14, and move the lever 20 thereby to move the pivoted support 18 to a position where the spring 49 will snap the support 18 to the position shown in dotted lines in Fig. 3. Now the operator may pull the hand lever 33 through neutral to the position shown in Fig. 15, thereby shifting the rotary part 47 of the valve 33ª so that air pressure is admitted to the pipe 9. Thus air is admitted above the piston 6 to drive it to the bottom of the cylinder 5. At the same time, the lever 33 shifts the port openings of the valve 33ª it also acts upon the rod 37 to release the jaws 35 from the slots 50—50 in the pin 7 so that the air pressure may be free to withdraw the pin from the dome 8. As the pin moves downwardly, the front end of the trailer moves with it until the wheels of the support 18 rest upon the ground, then the pin continues along until it is entirely withdrawn from the dome 8. The uncoupling is now complete and the driver may shift the lever 33 to its neutral position and drive the tractor away from the trailer.

When uncoupling is complete, as shown in Fig. 5, the valve 15 will be turned automatically to the position shown in Fig. 8, because the spring 17ᵇ, which is compressed when coupling is completed (Fig. 6), will force the plunger stem 17ª downwardly. This downward movement of the plunger stem 17ª acts through the lever 16 connected to the link 16ª (Fig. 1) to turn the valve 15, thereby placing the pipe 12ª in direct communication with the auxiliary tank 13ª so that air pressure may be supplied to the brake mechanisms of the brakes 13—13 of the trailer, thereby to prevent accidental movement of the trailer when the tractor is not coupled therewith.

From the above description taken in connection with the drawings it will be readily understood that I have provided simple and effective means for easily and quickly coupling together a tractor and trailer. The coupling means also automatically couples together means which permit operation of the brakes of the trailer when the brakes of the tractor are operated. The coupling operation also operates means whereby the front wheeled support of the trailer is swung up off the ground.

While I have shown and described a preferred embodiment of my invention, it should be understood that changes involving omission, substitution, alteration and reversal of parts, and even changes in the mode of operation may be made without departing from the scope of my invention, which is best defined in the following claims.

I claim:

1. In the combination of a tractor and trailer, a fifth wheel mechanism comprising a coupling pin presented by the tractor, a housing presented by the trailer for receiving the pin to couple the tractor and trailer together, means permitting the tractor to turn relative to the trailer and fluid-operated piston means moving in alignment with the coupling pin to force said pin into coupling engagement with said housing.

2. In a tractor and trailer, the combination of a fifth wheel mechanism including a fluid pressure-operated coupling device operable to couple the tractor and trailer, fluid-operated brakes for the wheels of the tractor and the trailer, means adapted to be connected to permit operation of said brakes from a single control when the tractor and trailer are completely coupled and means operable to automatically apply fluid-pressure and set the brakes of the trailer upon completion of uncoupling of the tractor from the trailer.

3. In the combination of a tractor and trailer each having fluid pressure-operated brakes, a source of pressure supply carried by the tractor for operation of the said brakes, a coupling mechanism having means operable from the said source of fluid pressure to couple the tractor with the trailer either when the tractor is aligned with or at various angles with relation to the trailer and a series of conduits and ports carried by the coupling mechanism and operable only when the tractor and trailer are coupled to permit transmission of fluid pressure to the brakes of the trailer for operation thereof.

4. In the combination of a tractor and trailer, a pivoted support for one end of the trailer, a fifth wheel cooperating between the tractor and trailer and having a part carried by the trailer and another part carried by the tractor to permit one to turn relative to the other, a fluid pressure operated coupling pin located at the fifth wheel and a plurality of pivoted levers associated with said fifth wheel parts and actuated by raising and lowering one of the fifth wheel parts relative to the other for raising and lowering the pivoted trailer support either when the tractor and trailer are in alignment or at an angle relative to each other.

5. In the combination of a tractor and trailer, a pivoted front support for the trailer, fluid pressure actuated coupling means for coupling the tractor and trailer, fluid pressure actuated brakes located on both the tractor and trailer, a source of fluid supply, means connecting the brakes on the trailer through the coupling means with the source of fluid-pressure supply, a single control connected to means for controlling the admission of the fluid-pressure to the brakes of both vehicles and a single lever connected to means for controlling the admission of fluid-pressure to the coupling means for operation of the pivoted support and the coupling and uncoupling mechanism.

6. In the combination of a tractor and trailer, air operated coupling means for coupling the vehicles together, a main air supply tank and an auxiliary air supply tank, means whereby the auxiliary tank may be supplied from the main supply tank when the vehicles are coupled, air operative brakes on both vehicles operable from a single control when the vehicles are coupled and means operable by uncoupling of the coupling means to place the brakes of the trailer in direct communication with the auxiliary supply tank for automatically setting the brakes of the trailer during uncoupling operation.

7. In a tractor and trailer, the combination of a fifth wheel mechanism, a fluid pressure operable coupling pin forming part of said mechanism, fluid pressure operated brakes located upon both the tractor and the trailer, a primary source of fluid supply for said brakes and a secondary source of fluid supply for the brakes of the trailer and means operable by raising and lowering said pin to place the fluid operable brakes of the trailer either in communication with the primary source of fluid supply or the secondary source of fluid supply to permit setting of said brakes.

8. In the combination of a tractor and trailer, coupling means including a fluid-actuated coupling part operable to couple the trailer with the tractor, fluid-actuated braking means provided upon the trailer, a source of fluid-pressure located upon the tractor and fluid-conducting means connected to said fluid-actuated braking means and to a part of the coupling means whereby the fluid-actuated braking means is automatically coupled with the source of fluid-pressure located on the tractor during the coupling operation thereby permitting operation of the brakes of the trailer by operation of a brake-controlling element located on the tractor.

9. In the combination of a tractor and trailer, a pivoted support at one end of the trailer, a fifth wheel cooperating between the tractor and trailer and having a part carried by the trailer, coupling means located at the fifth wheel to couple the tractor with the trailer, a plurality of pivoted catches and levers carried by the trailer and movable relative thereto, said catches and levers operatively connected with the pivoted trailer support, said catches being adapted to engage that part of the fifth wheel carried by the tractor to operatively connect the pivoted trailer support to a part of the tractor and means carried by the said tractor part and operatively connected to the said trailer part to raise that end of the trailer at which the pivoted support is located and actuate said catches and levers to raise the pivoted trailer support a substantial distance from the ground as and for the purposes described.

10. In the combination of a tractor and trailer, a pivoted front support for the trailer, coupling means carried partly by the trailer and partly by the tractor, fluid pressure actuated piston means movable in alignment with the axis of the coupling means for operating the coupling means to couple the trailer with the tractor, means operable by said piston means to swing the pivoted front support out of its normal position, valvular means for controlling the admission of the fluid-pressure to the piston means and a single hand-operated shifting lever operable from the driver's seat of the tractor and connected to said valvular means for operation thereof.

11. In the combination of a tractor and a trailer, a coupling mechanism comprising a coupling pin and a housing to receive the coupling pin whereby the tractor and trailer may be coupled together, a fluid-actuated piston means adapted to move in alignment with the said coupling pin to actuate one coupling part relative to the other and means actuated from the tractor and connected to the piston means for controlling the supply of fluid-pressure to the piston means.

12. In the combination of a tractor and a trailer, a coupling mechanism comprising a coupling pin and a housing to receive the coupling pin whereby the tractor and trailer may be coupled together, a fluid-actuated piston means adapted to move in alignment with the said coupling pin to actuate one coupling part relative to the other, means actuated from the tractor and connected to the piston means for controlling the supply of fluid-pressure to the piston means, a pivoted support located at one end of the trailer and means connecting the pivoted support to the coupling means whereby the operation of said piston means controls the raising and lowering of the said support.

In testimony whereof, I have signed my name to this specification.

NATHANIEL FINCH.